(12) United States Patent
Scherk et al.

(10) Patent No.: US 10,156,964 B2
(45) Date of Patent: Dec. 18, 2018

(54) MANAGING LARGE USER SELECTIONS IN AN APPLICATION

(71) Applicant: International Business Machines Corporation, Armonk, NY (US)

(72) Inventors: Anthony P. Scherk, Midway, KY (US); Timothy R. Schwarzen, Charlotte, NC (US); Timothy G. Shanahan, Boulder, CO (US); Gregory R. E. Wiley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 14/943,344

(22) Filed: Nov. 17, 2015

(65) Prior Publication Data
US 2016/0070426 A1   Mar. 10, 2016

Related U.S. Application Data

(63) Continuation of application No. 12/612,927, filed on Nov. 5, 2009, now Pat. No. 9,218,187.

(51) Int. Cl.
| | |
|---|---|
| G06F 3/048 | (2013.01) |
| G06F 3/0482 | (2013.01) |
| G06F 3/0484 | (2013.01) |
| G06F 9/451 | (2018.01) |

(52) U.S. Cl.
CPC ........ *G06F 3/0482* (2013.01); *G06F 3/04842* (2013.01); *G06F 9/451* (2018.02)

(58) Field of Classification Search
CPC combination set(s) only.
See application file for complete search history.

(56) References Cited

U.S. PATENT DOCUMENTS

| | | | |
|---|---|---|---|
| 7,328,201 B2 | 2/2008 | D'Ambrosio | |
| 7,389,498 B2 | 6/2008 | Meijer et al. | |
| 7,542,947 B2 | 6/2009 | Guyon et al. | |
| 8,812,532 B2 * | 8/2014 | Skaf | G06Q 30/02 707/768 |

(Continued)

OTHER PUBLICATIONS

Peter Bauer, Special Edition Using® Adobe® Photoshop® CS and Illustrator® CS (Feb. 13, 2004).*

(Continued)

*Primary Examiner* — Di Xiao
(74) *Attorney, Agent, or Firm* — Jay Wahlquist; Maxine L. Barasch; Keohane & D'Alessandro PLLC

(57) ABSTRACT

The present invention provides a system and methods for managing large user selections in an application. An invertible collection software module solves the problem of managing a large number of user selections within an application. When not inverted, the invertible collection tracks what a user has selected. When inverted, the invertible collection tracks what a user has not selected thus saving memory. One method may comprise defining a specific context having a set of items available for user selection, representing, by an empty inverted invertible collection, the selection of all items within the specific context, tracking one or more items a user has deselected within the specific context depending upon whether the collection is inverted or not inverted and tracking one or more items a user has deselected.

16 Claims, 6 Drawing Sheets

(56) References Cited

U.S. PATENT DOCUMENTS

2008/0250354 A1    10/2008   Park
2009/0123034 A1     5/2009   Bolle et al.
2010/0235791 A1*   9/2010   Chee .................... G06F 3/0482
                                                                                             715/825
2011/0107268 A1     5/2011   Scherk et al.

OTHER PUBLICATIONS

Bauer, Special Edition Using Adobe Photoshop CS and Illustrator CS, Feb. 13, 2004, 16 pages.

Koutsopoulos et al., "Cross-Layer Adaptive Techniques for Throughput Enhancement in Wireless OFDM-Based Networks," IEEE/ACM Transactions on Networking, vol. 14, No. 5, Oct. 2006, pp. 1056-1066.

Hilbert et al., "An Approach to Large-Scale Collection of Application Usage Data Over the Internet," IEEE/ACM Digital Library, Jun. 1998, pp. 136-145.

Xiao, U.S. Appl. No. 12/612,927, Office Action dated May 23, 2012, 29 pages.

Xiao, U.S. Appl. No. 12/612,927, Final Office Action dated Aug. 14, 2012, 12 pages.

Xiao, U.S. Appl. No. 12/612,927, Office Action dated Aug. 15, 2013, 15 pages.

Xiao, U.S. Appl. No. 12/612,927, Final Office Action dated Apr. 8, 2014, 14 pages.

Xiao, U.S. Appl. No. 12/612,927, Office Action dated Mar. 18, 2015, 21 pages.

Xiao, U.S. Appl. No. 12/612,927, Notice of Allowance dated Sep. 15, 2015, 9 pages.

* cited by examiner

MANAGING LARGE USER SELECTIONS IN AN APPLICATION

The present patent document is a continuation of U.S. patent application Ser. No. 12/612,927, filed Nov. 5, 2009, entitled "MANAGING LARGE USER SELECTIONS IN AN APPLICATION", the disclosure of which is incorporated herein by reference.

FIELD OF THE INVENTION

The present invention relates to a method or system of managing large user selections within an application. More specifically, the present invention discloses a method and system of managing large selections in the application such that the application tracks the items that are selected and the items that are not selected.

BACKGROUND OF THE INVENTION

There is a problem of managing a large number of user selections within an application. For example, consider a web page with a table that represents a portion of the items available for selection within the application. Each row of the table contains a checkbox, and there is also a "Select All" button for convenience, that, when clicked, leaves all checkboxes checked, including the ones not on the current web page. No known solution existed for managing potentially large numbers of user selections.

There are no known systems or methods of managing large selections in an application such that the application tracks the items that are selected and the items that are not selected.

SUMMARY OF THE INVENTION

The present invention provides a system and methods for managing large user selections within an application.

Further, the present invention provides a method in a system having an invertible collection for managing, by a user, large user selections comprising defining a specific context having a set of items available for user selection, representing, by an empty inverted invertible collection, the selection of all items within the specific context, tracking one or more items a user has deselected within the specific context depending upon whether the collection is inverted or not inverted and tracking one or more items a user has deselected.

Further, the present invention provides a method of selecting most items in a large collection by a user, the method comprising selecting, by the user, all of the items in the large collection, deselecting, by the user, individual or groups of items that are not wanted and storing, by the collection, those items that have been deselected by the user.

Further, the present invention provides a system for managing, by a user, large user selections in an application, the system comprising an application for allowing the user select and deselect some or all of individual or groups of items, a collection for holding the individual or groups of items, an invertible collection for inverting the selection or deselection by the user and wherein the user may select or deselect some or all of the individual or groups of items.

The present invention provides a computer program product embodied in a computer readable medium for operating in a system comprising a processing unit, a memory, a bus, and input/output (I/O) interfaces, for implementing a method comprising selecting, by the user, all of the items in the large collection, deselecting, by the user, individual or groups of items that are not wanted and storing, by the collection, those items that have been deselected by the user.

Further, the present invention provides a method for deploying a computing infrastructure comprising integrating computer-readable code into a computing system, wherein the code in combination with the computing system is capable of performing a process for managing large user selections within an application. the process comprising selecting, by the user, all of the items in the large collection, deselecting, by the user, individual or groups of items that are not wanted and storing, by the collection, those items that have been deselected by the user.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

The present invention comprises a system and method for managing large user selections within an application.

The present invention has several advantages over previously mentioned systems.

Figure 1:
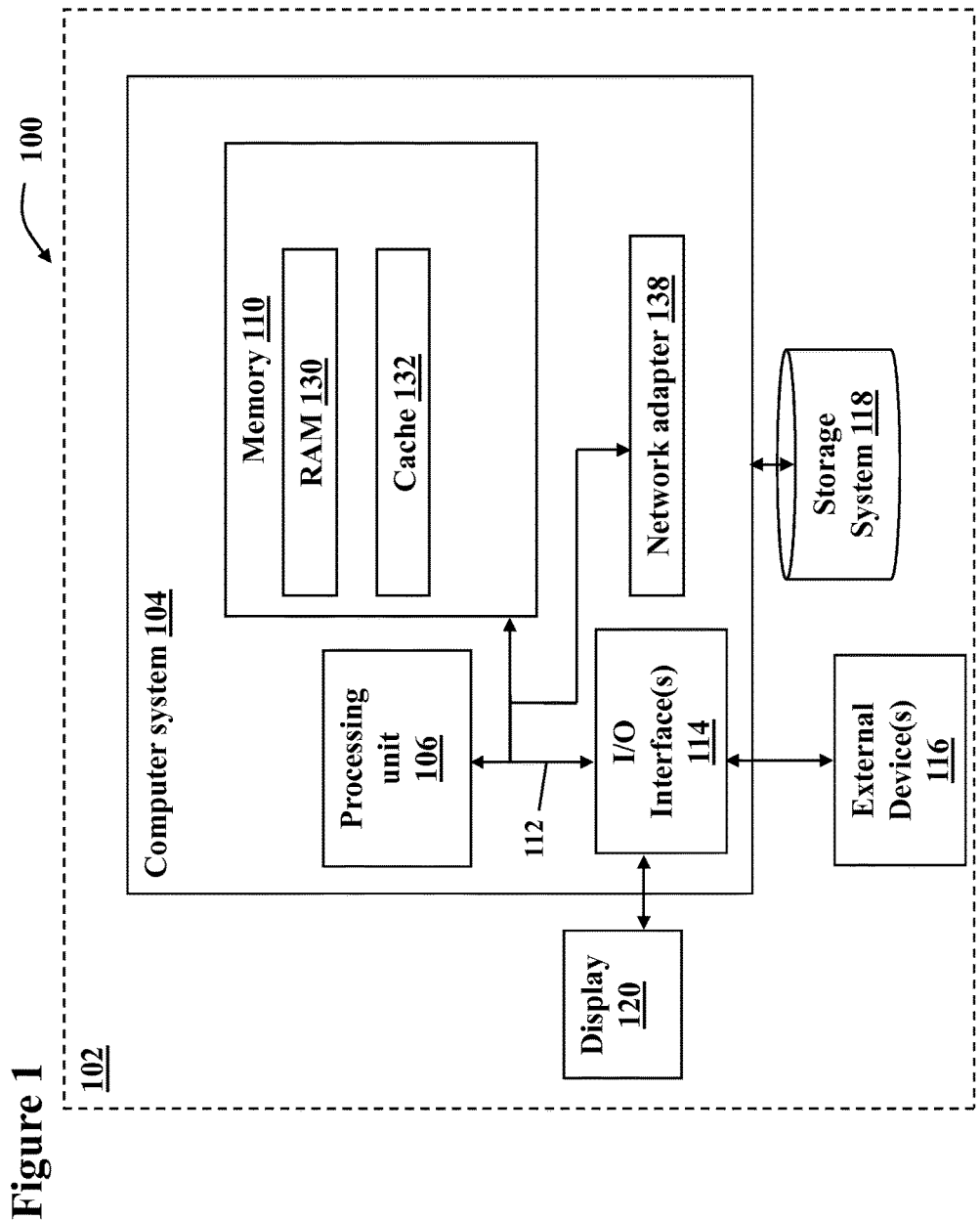
FIG. 1 shows a data processing system suitable for implementing an embodiment of the present invention.

FIG. 1 shows a system 100 that may have a data processing system 102 suitable for implementing an embodiment of the present invention. Data processing system 102 may have a computer system 104 connected to a display 120, external device(s) 116 and video camera 140 or other peripheral devices for providing a user an interface to computer system 140 being connected via I/O interface(s) 114. Computer system 104 may have an internal bus 112 for providing internal communication between such modules as processing unit 106, I/O interface(s) 114, network adapter 138 and memory 110. Memory 110 may have random access memory (RAM) 130, cache 132 and storage system 118 or other forms of memory. RAM may take the form of integrated circuits that allow stored data to be accessed in any order (i.e., at random). Storage system 118 may take the form of tapes, magnetic discs and optical discs and are generally used for long term storage of data. Cache 132 is a memory for storing a collection of data—duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, it can be used in the future by accessing the cached copy rather than re-fetching or recomputing the original data. A cache has proven to be extremely effective in many areas of computing because access patterns in typical computer applications have locality of reference.

Figure 2:
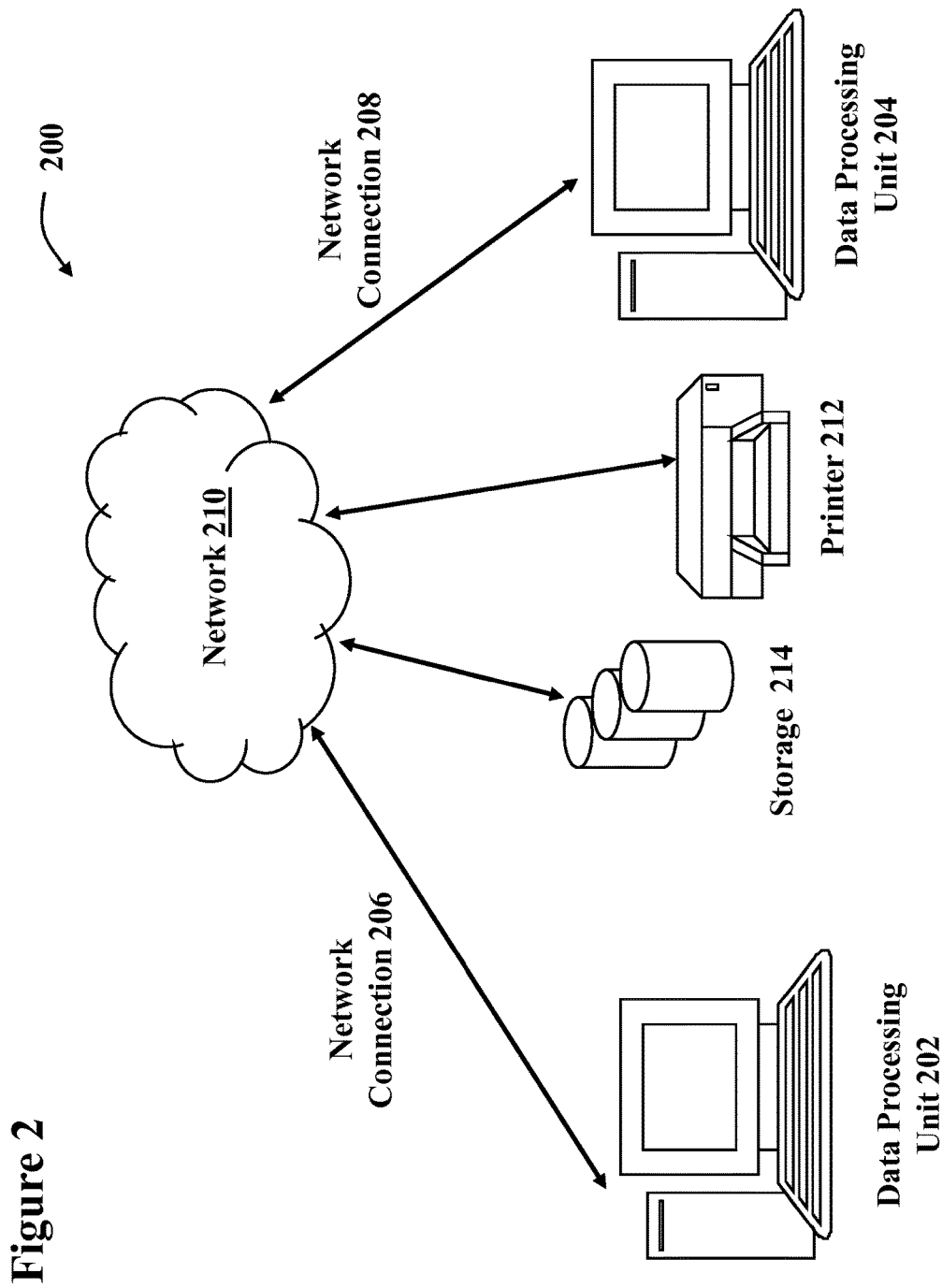
FIG. 2 shows a network for implementing an embodiment of the present invention.

FIG. 2 shows a network system 200 for implementing an embodiment of the present invention. Network system 200 may have a network 210 or group of interconnected computers, such as data processing units 202, 204, via network connections 206, 208 and may be of the type, e.g., a local area network (LAN) or internetwork. Printer 212 and storage 214 may be connected to network 210 via network connections 216, 218. Basic network components may include network interface cards, repeaters, hubs, bridges, switches and routers. Data processing units 202, 204 may be computers such as web servers or personal computers, or other user agents. A web server generally has hardware and software that are responsible for accepting HTTP requests from clients (user agents such as web browsers), and serving them HTTP responses along with optional data contents, which usually are web pages such as HTML documents and linked objects (images, etc.). In this document, the term "web browser" is used but any application for retrieving, presenting, and traversing information resources on the Internet must be considered.

Invertible collection solves the problem of managing a large number of user selections within an application. For example, consider a web page with a table that represents a portion of the items available for selection within the application. Each row of the table contains a checkbox, and there is also a "Select All" button for convenience, that, when clicked, leaves all checkboxes checked, including the ones not on the current page. No known solution exist for managing potentially large numbers of user selections. When not inverted, an invertible collection tracks what a user has selected. When inverted, an invertible collection tracks what a user has not selected. By design, an empty inverted invertible collection represents the selection of all items within a given context.

A specific context within an application defines a set of items available for user selection. An invertible collection enables tracking of what the user has or has not selected within that context depending on whether the collection is inverted or not.

Figure 3:
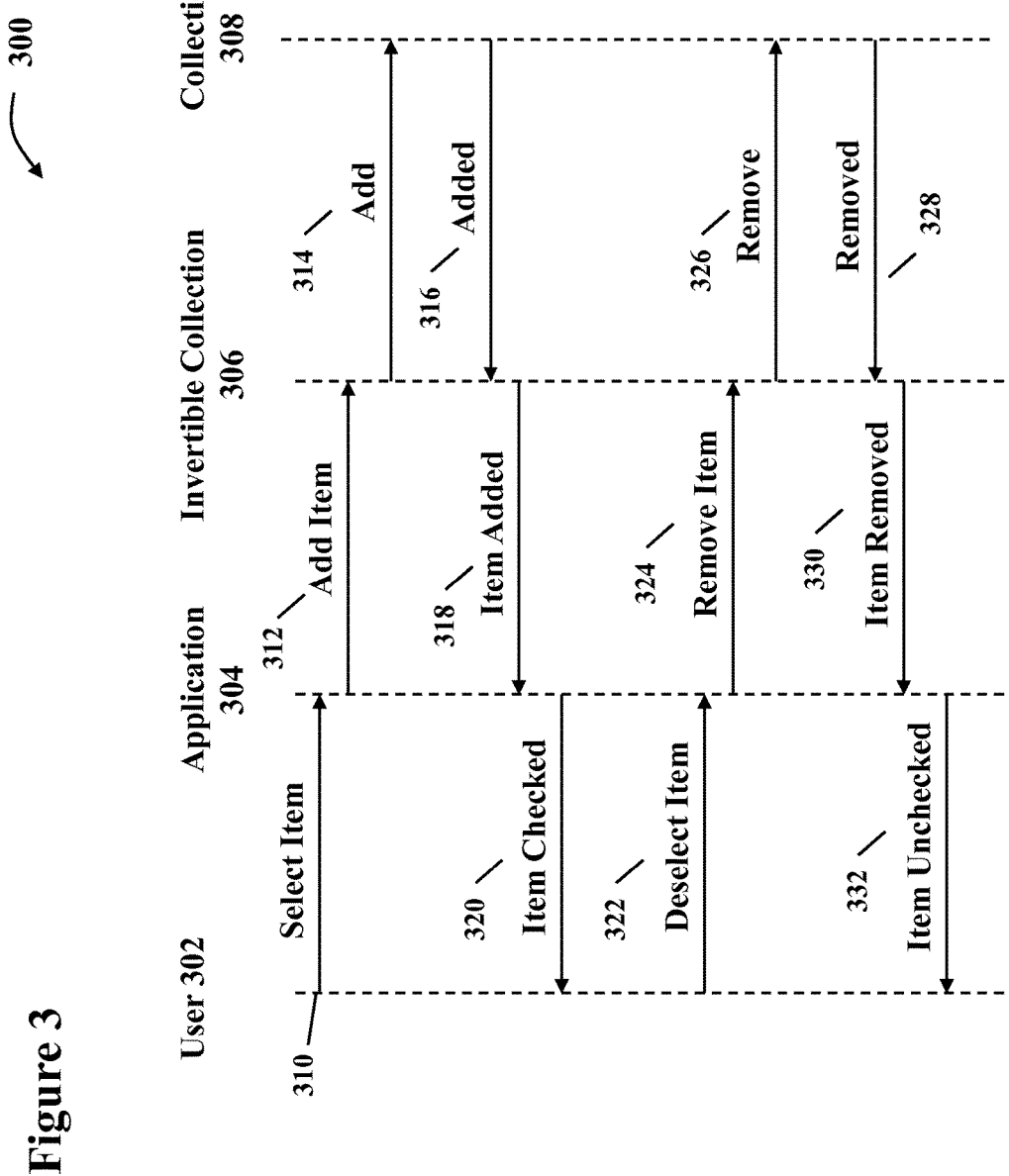
FIG. 3 illustrates an embodiment of a method of the present invention.

For a normal (i.e., non-inverted) invertible collection, when items are selected, they are added to a collection managed by an invertible collection. The "invertible collection" may be a software module for executing invertible collection activities. When items are deselected, they are removed from that collection, as outlined in the method 300 shown in FIG. 3.

The method 300 shows a user 302, an application 304, an invertible collection 306, and a collection 308. At 310, user 302 selects an item to be added to collection 308 and application 304 indicates that the selected item is to be added to collection 308 to invertible collection 306 at 312. At 314, invertible collection 306 indicates that the selected item is to be added to collection 308. At 316, after collection 308 adds the selected item to collection 308, collection 308 indicates to invertible collection 306 that the selected item was added. At 318, invertible collection 306 indicates to application 304 that the selected item was added. At 320, application 304 indicates to user 302 that the selected item was added.

When user 302 deselects an item at 322 for removal from collection 308, application 304 sends an indication to invertible collection 306 to remove item at 324. At 326, invertible collection 306 sends an indication to remove the deselected item to collection 308. At 328, after the deselected item is removed from collection 308, collection 308 indicates to invertible collection 306 that the deselected item was removed from collection 308. At 330, invertible collection 306 indicates to application 304 that the deselected item was removed from collection 308. At 332, application 304 indicates to user 302 that the deselected item was removed.

Figure 4:
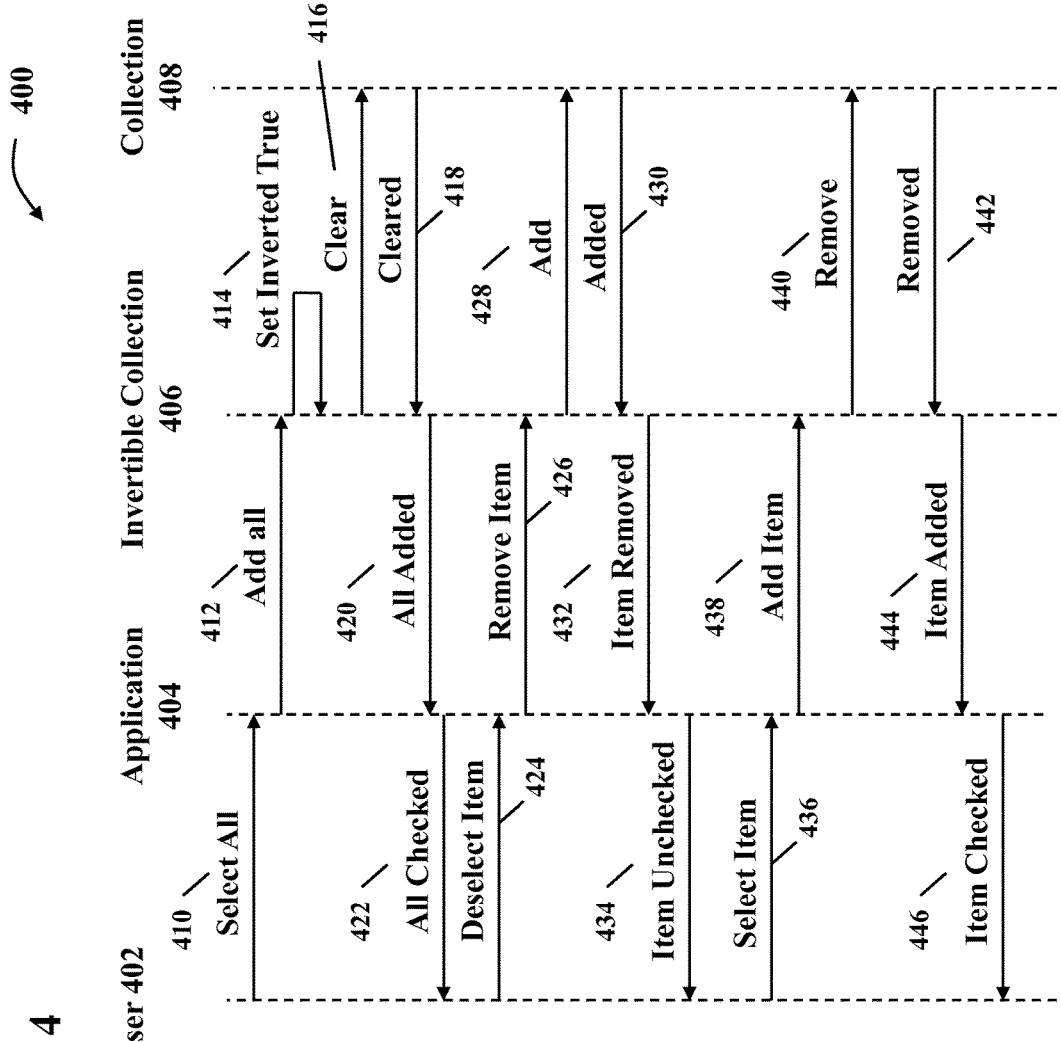
FIG. 4 illustrates another embodiment of a method of the present invention.

To invert an invertible collection, a user would use a "Select All" button as shown in the method 400 of FIG. 4, which would logically add all items to the invertible collection. This inverts the invertible collection and clears all items from the collection managed by the invertible collection. When items are deselected, they are added to the collection managed by invertible collection. When items are selected, they are removed from the collection managed by invertible collection.

The method 400 shows a user 402, an application 404, an invertible collection 406, and a collection 408. At 410, user 402 selects all items by choosing, for example, a "Select All" button on the user's client (such as a personal computer, a handheld device or other client) to be added to collection 408 and application 404 indicates that all items are selected to be added to collection 408 to invertible collection 406 at 412. At 414, invertible collection 406 sets an "inverted true" indicator and, at 416, indicates to collection 408 to "clear". At 418, after collection 408 clears all items, collection 408 indicates to invertible collection 406 that all items were cleared. At 420, invertible collection 406 indicates to application 404 that all items were added. At 422, application 404 indicates to user 402 that all items were checked.

When user 402 deselects an item at 424 for removal from collection 408, application 404 sends an indication to invertible collection 406 to remove item at 426. At 428, invertible collection 406 sends an indication to remove the deselected item to collection 408. At 430, after the deselected item is removed from collection 408, collection 408 indicates to invertible collection 406 that the deselected item was removed from collection 408. At 432, invertible collection 406 indicates to application 404 that the deselected item was removed from collection 408. At 434, application 404 indicates to user 402 that the deselected item was removed.

The method 400 further shows a user 402 who selects an item at 436 to be added to collection 408 and application 404 indicates that the selected item is to be added to collection 408 to invertible collection 406 at 438. At 440, invertible collection 406 indicates to collection 408 that the selected item is to be removed from collection 408. At 442, after collection 408 removes the selected item to collection 408, collection 408 indicates to invertible collection 406 that the selected item was removed. At 444, invertible collection 406 indicates to application 404 that the selected item was added. At 446, application 404 indicates to user 402 that the selected item was added.

Figure 5:
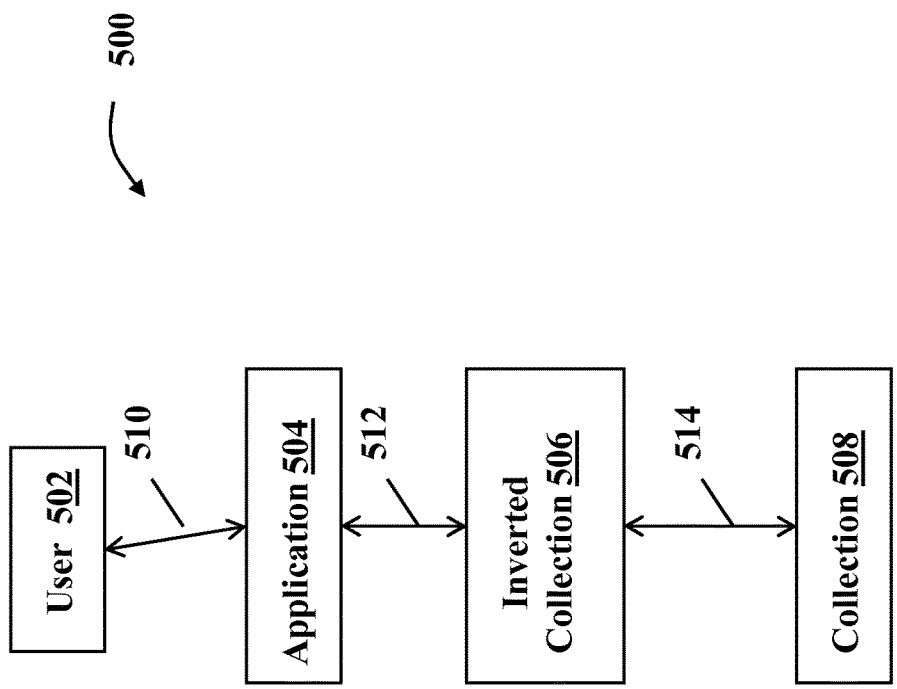
FIG. 5 illustrates an embodiment of the system of the present invention.

FIG. 5 illustrates an embodiment 500 of the system of the present invention. User 502 is connected to application 504 via connection 512. The user may be connected locally or via a network connection as described in FIG. 2. The user may utilize a personal computer, a handheld device or the like to access application 504. Application 504 may be a software module installed either locally to user 502 or remotely on, for example, a server. Application 504 is connected to inverted collection 506, which is connected to collection 508 via connections 512, 514, respectively. Each of these connections may be local or networked. Inverted collection 506 may be a software module operating locally to or remotely from collection 508. Collection 508 may be a database having a software control module connected thereto.

Figure 6:
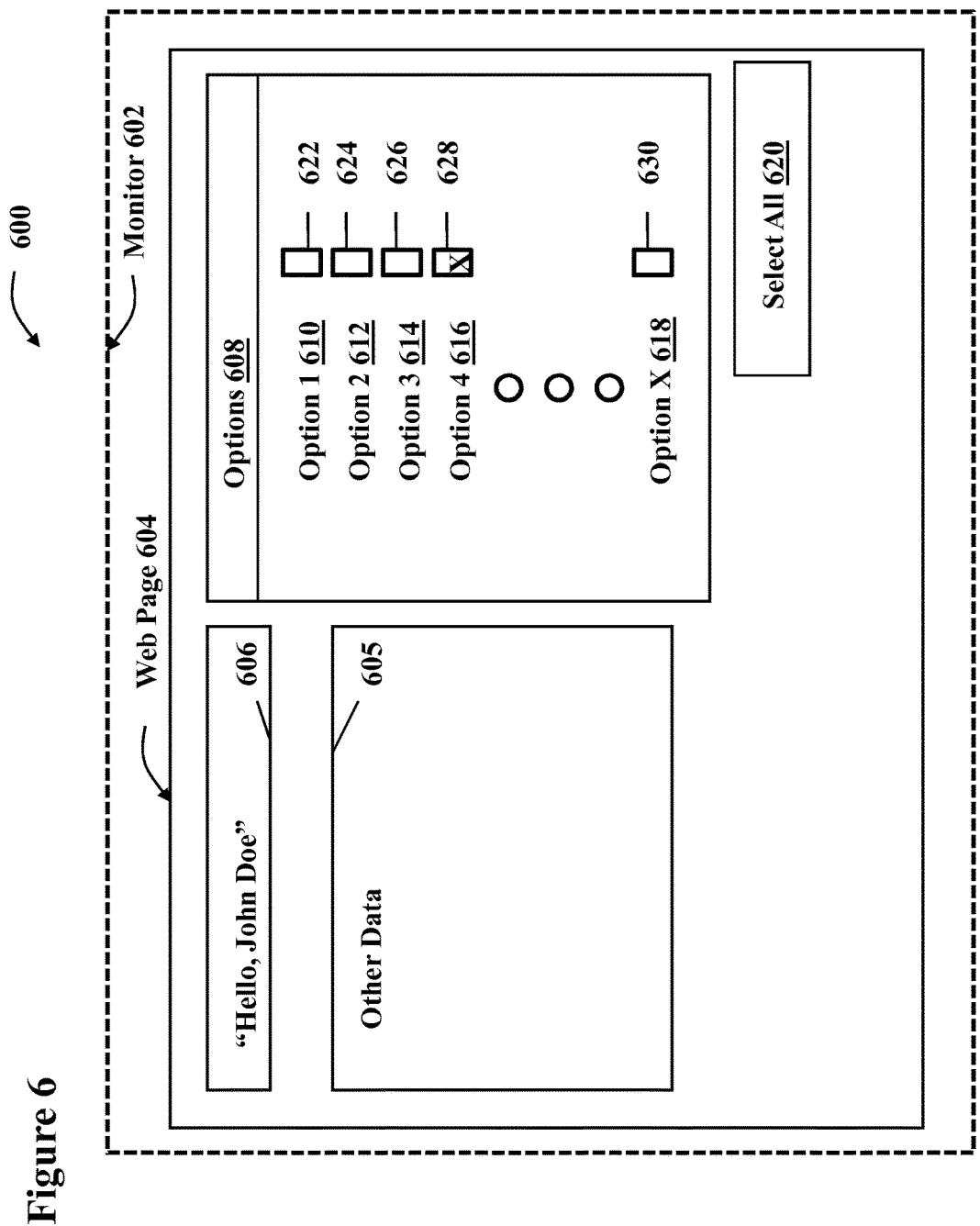
FIG. 6 illustrates another embodiment of the system of the present invention.

FIG. 6 illustrates a user interface 600 having a monitor 602 showing a web page 604. As noted above, user interface 600 may be on virtually any electronic device such as a personal computer or a handheld device such as a personal digital assistant (PDA) or cellular telephone. Web page 604 may have a welcome frame 606 welcoming a user, other data frame 605 and an options frame 608 offering options to the user on a user interface. Options frame 608 may have a large number of options 610, 612, 614, 616, and 618. The number of options may be quite large, such as to upwards of 100,000 items. Each of the options may be selected individually by the user by the user activating, or clicking on, check boxes 622, 624, 626, 628, 630. Check boxes 622, 624, 626, 628, 630 provide an indication as to whether an option has been selected. As shown in FIG. 6, Option 4 616 has been selected while the remaining options have not been selected or have been deselected by the user. Conversely, the user interface 600 may further provide a Select All button 620 so that the user may select all of the options. After activating the Select All button 620, the user may deselect options not wanted by the user by the user deactivating, or clicking on, check boxes 622, 624, 626, 628, 630 which have been previously selected.

A user may want to take action on all but one item in a given context. Using normal collections, an application would have to track all of those items. By using the method of an invertible collection, instead of the application having to consume memory to track the items that are selected, the application will only consume the memory for the items not selected.

The methods of the present invention work especially well when dealing with a large context, e.g., comprised of 100,000 or more items, especially because users generally do not spend time selecting thousands of items.

While shown and described herein as a system and methods of managing large user selections within an application, the present invention may comprise other systems and methods. While the present invention also provides for business applications for managing large user selections within an application, it is understood that the invention further provides various alternative embodiments. For example, in one embodiment, the invention provides a computer-readable/useable medium that includes computer program code to enable a computer infrastructure for a system to allow managing large user selections within an application. To this extent, the computer-readable/useable medium includes program code that implements each of the various process steps of the invention.

It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for managing large user selections within an application. In this embodiment of the present invention, a computerized infrastructure may be provided and one or more systems may be provided for performing process steps of the invention that may be obtained and deployed to the computerized infrastructure.

A process for deployment of a system of the present invention can comprise one or more process steps of installing program code on a computing device, such as computer system from a computer-readable medium, adding one or more computing devices to the computer infrastructure, and incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for managing large user selections comprising:
    defining a specific context having a set of items available for user selection, each of the set of items representing a different selectable option corresponding to an action within an application;
    representing, by an empty inverted invertible collection, the selection of all items within the specific context;
    storing, as a collection, in a storage device operable with the application, only one or more items a user has deselected within the specific context; and
    tracking the collection within the storage device of the one or more items the user has deselected;
    wherein the application is connected to the empty inverted invertible collection via a first connection, and the empty inverted invertible collection is connected to the collection via a second connection.

2. The method of claim 1, wherein the application, the empty inverted invertible collection, and the collection are separate from one another.

3. The method of claim 2, wherein the application is connected to the empty inverted invertible collection via a first connection, and the empty inverted invertible collection is connected to the collection via a second connection.

4. The method of claim 1, wherein all other items of the large user selections not stored in the collection are not monitored.

5. The method as defined in claim 1, further comprising deselecting, by the user, the one or more items of the set of items.

6. The method of claim 1, wherein a computing infrastructure is deployed operable to perform the method.

7. A system for managing large user selections of items, the system comprising:
   an application configured to define a specific context having a set of items available for user selection, each of the set of items representing a different selectable option corresponding to an action within an application;
   an empty inverted invertible collection representing the selection of all items within the specific context;
   a storage device operable with the application, storing as a collection only one or more items a user has deselected within the specific context; and
   the application further configured to track the collection within the storage device of the one or more items the user has deselected;
   wherein the application is connected to the empty inverted invertible collection via a first connection, and the empty inverted invertible collection is connected to the collection via a second connection.

8. The system of claim 7, wherein the application, the empty inverted invertible collection, and the collection are separate from one another.

9. The system of claim 8, wherein the application is connected to the empty inverted invertible collection via a first connection, and the empty inverted invertible collection is connected to the collection via a second connection.

10. The system of claim 7, wherein the application is configured to not track all other items of the large user selections not stored in the collection.

11. The method as defined in claim 7, further comprising the application configured to receive a deselection, by the user, of the one or more items of the set of items.

12. A computer program product embodied in a computer readable medium for operating in a system comprising a processing unit, a memory, a bus, input/output (I/O) interfaces, an application, an empty inverted invertible collection, and a collection, the computer program product for implementing a method for managing large user selections of items comprising:
   defining a specific context having a set of items available for user selection, each of the set of items representing a different selectable option corresponding to an action within the application;
   representing, by an empty inverted invertible collection, the selection of all items within the specific context;
   storing in the collection, in a storage device operable with the application, only one or more items a user has deselected within the specific context; and
   tracking the collection within the storage device of the one or more items the user has deselected;
   wherein the application is connected to the empty inverted invertible collection via a first connection, and the empty inverted invertible collection is connected to the collection via a second connection.

13. The method of claim 12, wherein the application, the empty inverted invertible collection, and the collection are separate from one another.

14. The method of claim 13, wherein the application is connected to the empty inverted invertible collection via a first connection, and the empty inverted invertible collection is connected to the collection via a second connection.

15. The method of claim 12, wherein all other items of the large user selections not stored in the collection are not monitored.

16. The method as defined in claim 12, further comprising deselecting, by the user, the one or more items of the set of items.

* * * * *